(12) United States Patent
Kuo et al.

(10) Patent No.: US 9,975,675 B1
(45) Date of Patent: May 22, 2018

(54) LUMINOUS BOTTLE STOPPER

(71) Applicants: Chia-Shin Kuo, New Taipei (TW);
Yu-Feng Kuo, New Taipei (TW)

(72) Inventors: Chia-Shin Kuo, New Taipei (TW);
Yu-Feng Kuo, New Taipei (TW)

( * ) Notice: Subject to any disclaimer, the term of this patent is extended or adjusted under 35 U.S.C. 154(b) by 0 days. days.

(21) Appl. No.: 15/666,426

(22) Filed: Aug. 1, 2017

(51) Int. Cl.
| | |
|---|---|
| *F21V 33/00* | (2006.01) |
| *B65D 51/24* | (2006.01) |
| *F21V 31/00* | (2006.01) |
| *F21V 8/00* | (2006.01) |
| *B65D 39/08* | (2006.01) |

(52) U.S. Cl.
CPC .......... *B65D 51/248* (2013.01); *B65D 39/08* (2013.01); *F21V 31/005* (2013.01); *F21V 33/0024* (2013.01); *G02B 6/0036* (2013.01); *G02B 6/0045* (2013.01)

(58) Field of Classification Search
CPC ..... B65D 39/08; B65D 51/248; F21V 31/005; F21V 33/0024; F21V 33/0036; G02B 6/0036; G02B 6/0045

USPC ................................................ 362/101, 562
See application file for complete search history.

(56) References Cited

U.S. PATENT DOCUMENTS 6,902,304 B2 * 6/2005 Yang .................. B65D 39/0094
362/101

* cited by examiner

*Primary Examiner* — Jason Moon Han
(74) *Attorney, Agent, or Firm* — Chun-Ming Shih; HDLS IPR Services

(57) ABSTRACT

A luminous bottle stopper (1) includes a light guide body (10), a light emitting module (20), a power module (30), a stopper cover (40) and a flexible sleeve (50). The light guide body (10) has an accommodating space (110) including a light guide seat (11) and a light guide column (12). The light emitting module (20) is installed in the accommodating space (110) and includes a circuit board and a light emitting element (22). The power module (30) is installed in the accommodating space (110) and includes a battery (31) and a conduct element (32). The stopper cover (40) is combined with the light guide seat (11) and sealed the accommodating space (110). The flexible sleeve (50) is sleeved on the light guide column (12) and able to be plugged in the mouth (2) of bottle. Thereby, the identification and overall appearance of the bottle can be enhanced.

10 Claims, 6 Drawing Sheets

LUMINOUS BOTTLE STOPPER

BACKGROUND OF THE INVENTION

Field of the Invention

The present invention generally relates to a bottle stopper and, in particular to a luminous bottle stopper.

Description of Prior Art

There are a lot of wine bottles provided with bottle stoppers. As wines are usually not one-time drinking, so bottle stoppers can be used to seal the mouth of bottle when some wine are still left in the bottle. Thus external air can be prevented from entering the bottle, and a long-term reserve of wine can be achieved.

Furthermore, the designs of the bottle stoppers can not only seal the mouth of bottle but also enhance the design sense and overall appearance as to attract consumers for increasing purchase intention if the designs of the bottle stoppers are corresponded with the bottles. Thus, how to design a new bottle stopper with additional features such as to enhance the identification or the overall appearance is the research motivation of the present invention.

In view of the above drawbacks, the Inventor proposes the present invention based on his expert knowledge and elaborate researches in order to solve the problems of prior art.

SUMMARY OF THE INVENTION

Accordingly, an object of the present invention is to provide a luminous bottle stopper as to enhance the effects of identification and overall appearance.

In order to achieve the object mentioned above, the present invention provides a luminous bottle stopper to be plugged in a mouth of bottle comprising a light guide body, a light emitting module, a power module, a stopper cover and a flexible sleeve. The light guide body is made of light transmitting material and includes a light guide seat and a light guide column, and the light guide seat has an accommodating space. The light emitting module is installed in the accommodating space and includes a circuit board and a light emitting element electrically connected with the circuit board. The power module is installed in the accommodating space and includes at least one battery and a conduct element electrically connected with the at least one battery. The conduct element is electrically connected with the circuit board. The stopper cover is combined with the light guide seat and sealed the accommodating space. The flexible sleeve is made of light transmitting material and sleeved on the light guide column and is able to be plugged in the mouth of bottle. Thereby the identification and the overall appearance can be enhanced.

Comparing to the prior art, the bottle stopper of the present invention includes a light guide body, a light emitting module, a power module, a stopper cover and a flexible sleeve. The light guide body includes a light guide seat and a light guide column. The light emitting module and the power module are disposed in the light guide seat. In addition, the light guide body and the flexible sleeve are made of light transmitting material; therefore, the light emitted from the light emitting element will be transmitted to the light guide seat and the light guide column and then transmitted to the outside through the light guide seat. On the other hand, the light emitted to the light guide column will pass through the flexible sleeve and the mouth of the bottle so that the luminous bottle stopper and areas surrounding the mouth of the bottle both have lighting effects as to enhance the identification, creativity and uniqueness of the overall appearance.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
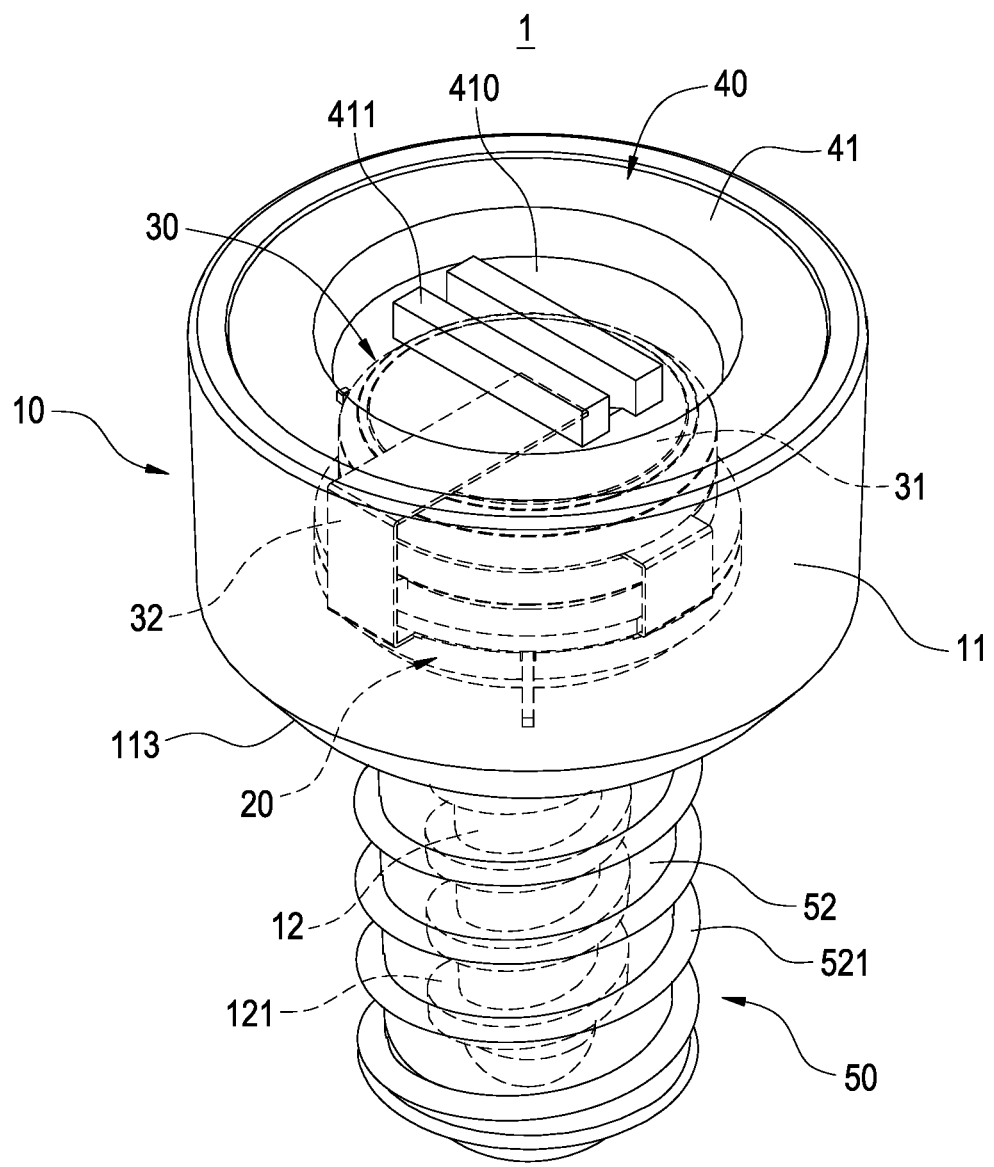
FIG. 1 is a perspective schematic view in one side of the luminous bottle stopper of the present invention.
Figure 2:
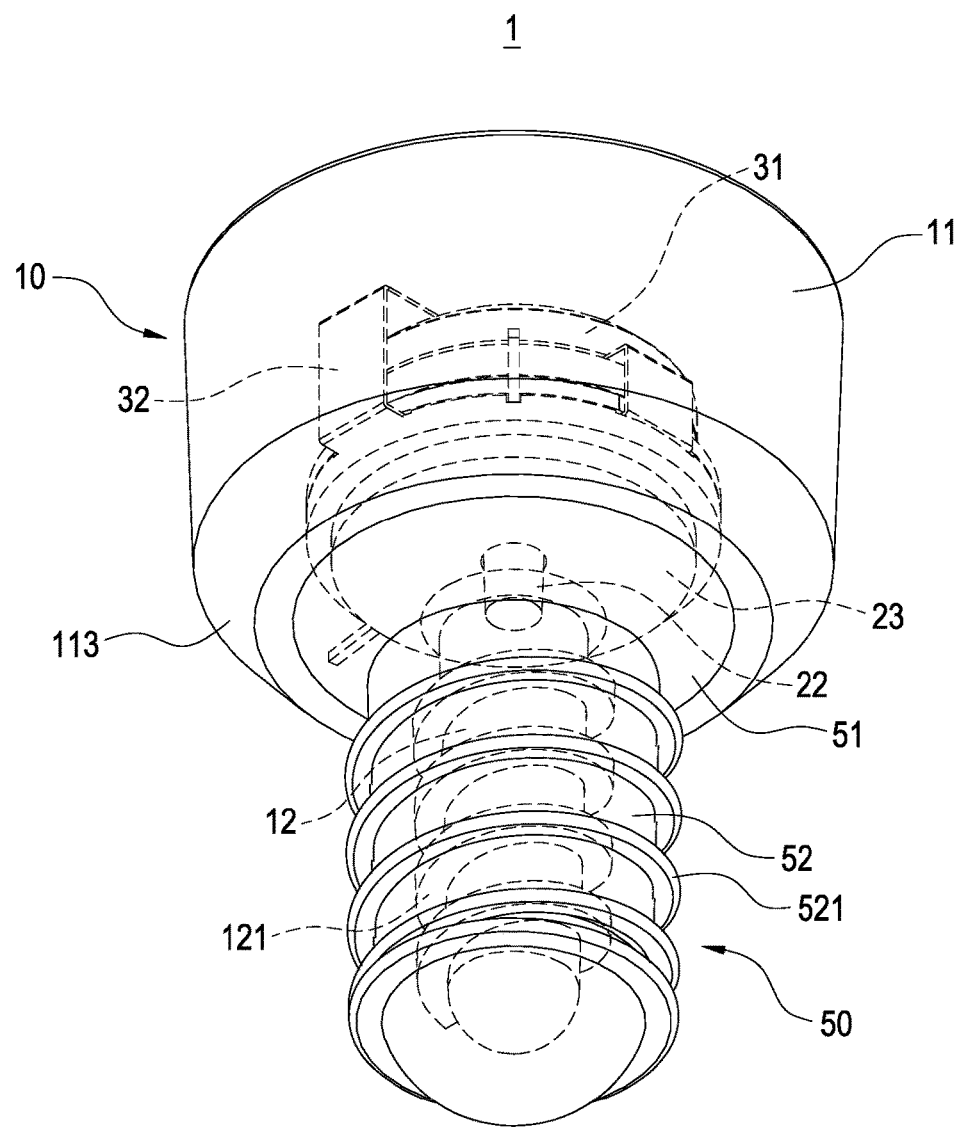
FIG. 2 is a perspective schematic view in another side of the luminous bottle stopper of the present invention.

Please refer to FIG. 1 and FIG. 2, which depict perspective schematic views of two sides of the luminous bottle stopper. The present invention provides a luminous bottle stopper 1 including a light guide body 10, a light emitting module 20, a power module 30, a stopper cover 40 and a flexible sleeve 50. The light emitting module 20 and the power module 30 are disposed in the light guide body 10. The stopper cover 40 and the flexible sleeve 50 are combined on two sides of the light guide body 10 separately as to constitute the luminous bottle stopper 1. More details of the luminous bottle stopper 1 are descripted as follows.

Figure 3:
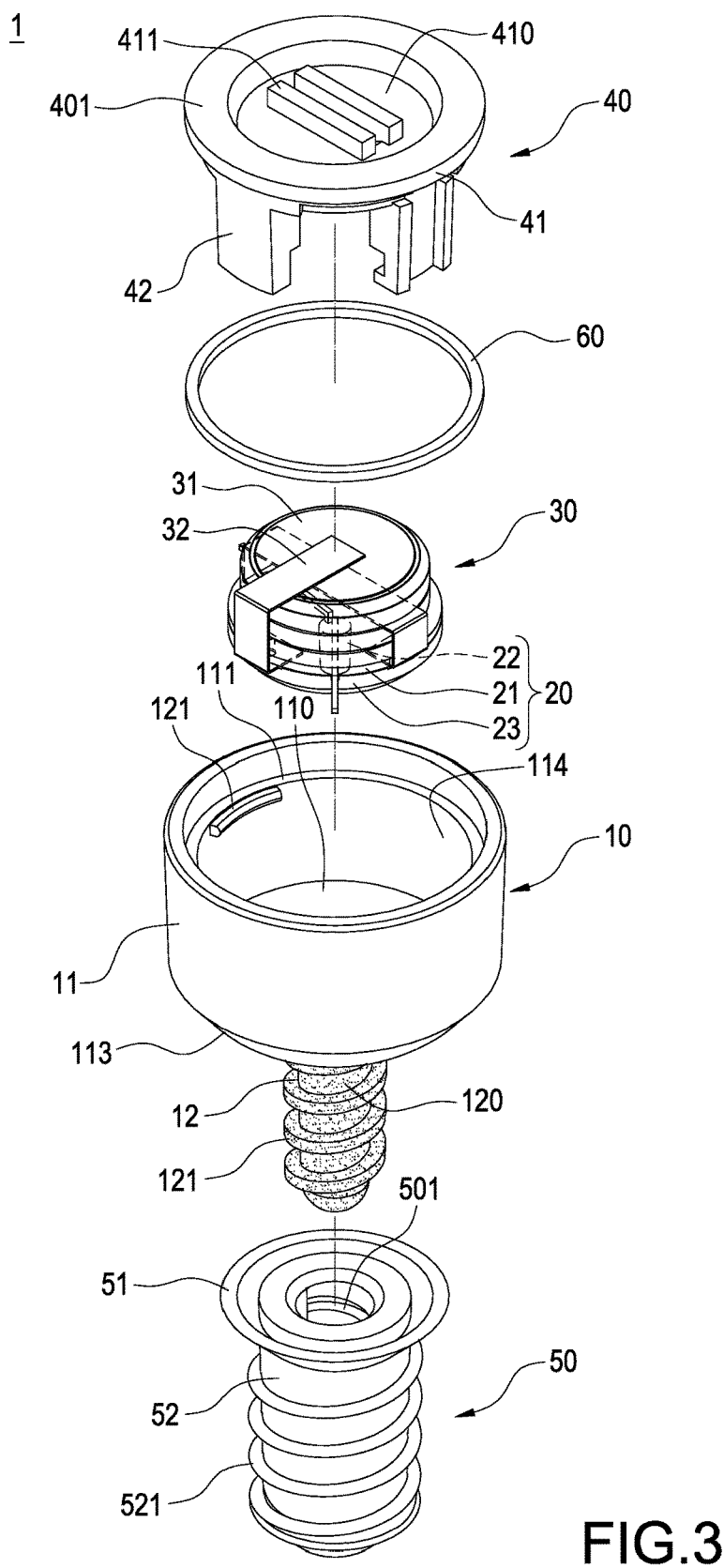
FIG. 3 is a perspective explosion schematic view of the luminous bottle stopper of the present invention.
Figure 4:
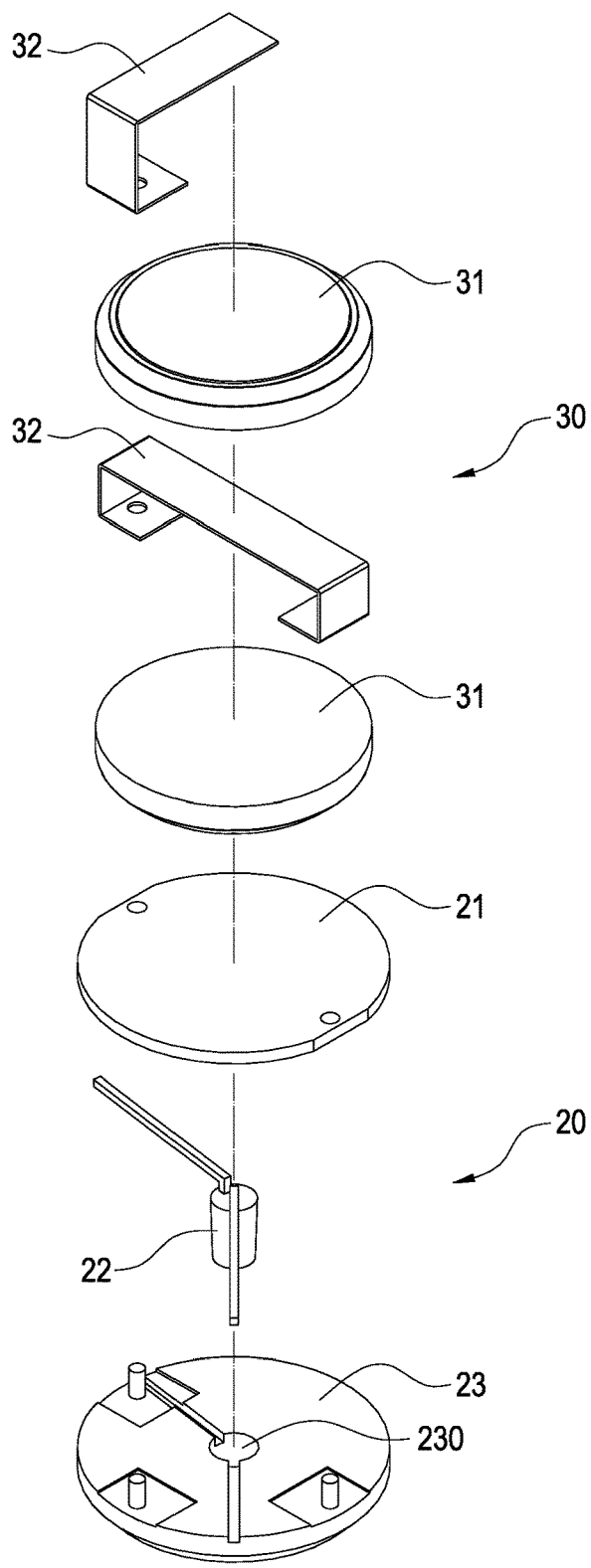
FIG. 4 is a perspective explosion schematic view of the light emitting module and the power module of the present invention.

Please further refer to FIG. 3 and FIG. 4, which depict an explosion schematic view of the luminous bottle stopper of the present invention and an explosion schematic view of the light emitting module and the power module of the present invention. In an embodiment of the present invention, the light guide body 10 is made of light transmitting material. The light guide body 10 includes a light guide seat 11 and a light guide column 12 connected with the light guide seat 11, and the light guide seat 11 has an accommodating space 110.

Preferably, the light guide seat 11 and the light guide column 12 are formed as an integral body. Besides, an outer peripheral surface of the light guide column 12 has formed a light guide rib 121 shaped in helical. The arrangement of the light guide rib 121 can facilitate a uniform and soft light conducting for a better luminous efficiency. Furthermore, the light guide column 12 also has textures, printed veins or carved light guide lines 120 as to enhance the lighting effects.

In the present embodiment, the light guide seat 11 has a light guide angle 113 neighboring a side of the light guide column 12, and the deposition of the light guide angle 113 can transmit the light emitted from the light emitting module 20 to the light guide column 12. It is worthy of notice that an inner wall of the light guide seat 11 has further provided with a reflecting layer 114, and the deposition of the reflecting layer 114 can increase the luminous efficiency.

The light emitting module 20 is installed in the accommodating space 110 of the light guide seat 11. The light emitting module 20 includes a circuit board 21 and a light emitting element 22 electrically connected with the circuit board 21. In the present embodiment, the light emitting element 22 is, but not limited to, a light emitting diode (LED).

The power module 30 is installed in the accommodating space 110 of the light guide seat 11 and located in a lateral side of the light emitting module 20. The power module 30 is the power source of the light emitting module 20 including at least one battery 31 and a conduct element 32 electrically connected with the at least one battery 31, and the conduct element 32 is electrically connected with the circuit board 21. Thus, the battery 31 can be electrically to the light emitting element 22 through the circuit board 21 and provide power to the light emitting element 22 for the lighting. In the present embodiment, the conduct element 32 is a conductive sheet, however, in real practice, the conduct element 32 can be a wire and so on.

It is to be noted that the battery 31 may be provided as a dry battery, a lithium battery, a button battery, or a rechargeable battery. In addition, the power module 30 can further include a touch switch. The touch switch is electrically connected with the circuit board 21 and can be disposed in the stopper cover 40 for controlling the light emitting element 22, The stopper cover 40 is coupled to the light guide seat 11 and sealed the accommodating space 110.

Moreover, the flexible sleeve 50 is made of light transmitting material and sleeved on the light guide column 12. In an embodiment of the present invention, the flexible sleeve 50 comprises a holding portion 51 and a revolving fasten portion 52. The holding portion 51 is abutted upon a bottom of the light guide seat 11, and an outer peripheral surface of the revolving fasten portion 52 has formed a seal rib 521 shaped in a helical.

Specifically, an outer peripheral surface of the light guide column 12 of the light guide body 10 has formed a light guide rib 121. Moreover, the flexible sleeve 50 has formed a light guide slot 501 shaped in helical corresponding to the light guide rib 121, and the light guide rib 121 of the light guide column 12 is located in the light guide slot 501.

In an embodiment of the present invention, the luminous bottle stopper 1 further includes a seal ring 60 disposed between the light guide seat 11 and the stopper cover 40 as to enhance the leak tightness therebetween. Furthermore, the light guide seat 11 has formed an annular groove 111 in the accommodating space 110, and the stopper cover 40 has a pressing plate 401 disposed correspondingly above the annular groove 111. Accordingly, the seal ring 60 is disposed in the annular groove 111 and pressed by the pressing plate 401; thereby, external air or moisture can be prevented from entering the accommodating space 110.

Preferably, an inner wall of the light guide seat 11 are formed a plurality of resist ribs 112 at a bottom of the annular groove 111, and the resist ribs 112 are tightly attached to the periphery of the stopper cover 40 as to fix the stopper cover 40 on the light guide seat 11. In the present embodiment, the stopper cover 40 includes a cover plate 41 and a plurality of support plate 42 connected with the cover plate 41, and the resist ribs 112 abut against an outer side of the support plate 42. Furthermore, the cover plate 41 has a notch 410, and the cover plate 41 has formed a positioning portion 411 in the notch 410 (in the present embodiment, a position groove is configured by a pair of ribs). Thereby, the luminous bottle stopper 1 of the present invention is movable by exerting on the positioning portion 411 and rotating it.

It is to be noted that, in the present embodiment, the light emitting module 20 further includes a bearing seat 23. The bearing seat 23 carries the circuit board 21 and has a through hole 230 corresponding to the light emitting element 22. Moreover, one part of the light emitting element 22 is located in the through hole 230 and another part thereof is located in the light guide seat 11.

Figure 5:
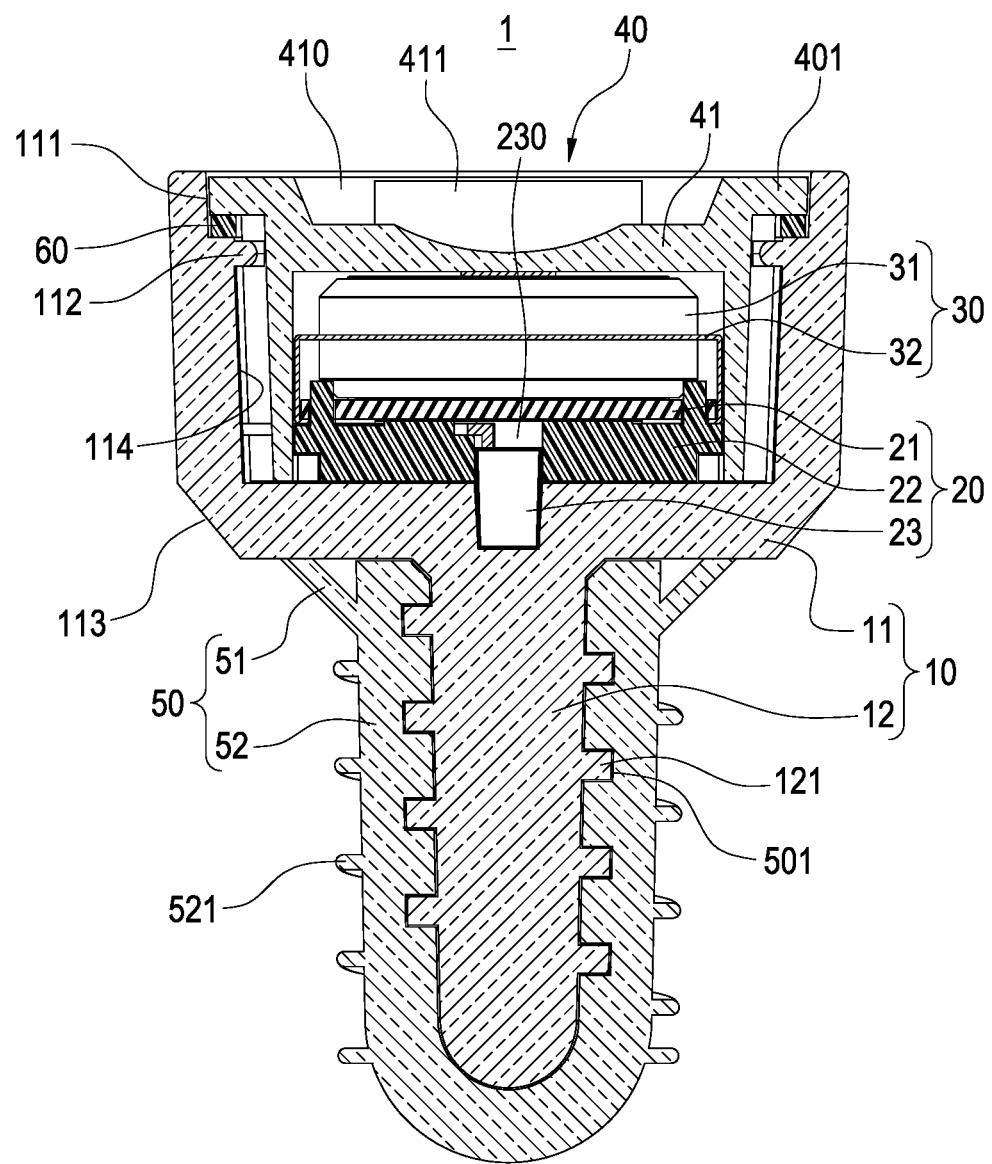
FIG. 5 is a cross sectional view of the luminous bottle stopper of the present invention.
Figure 6:
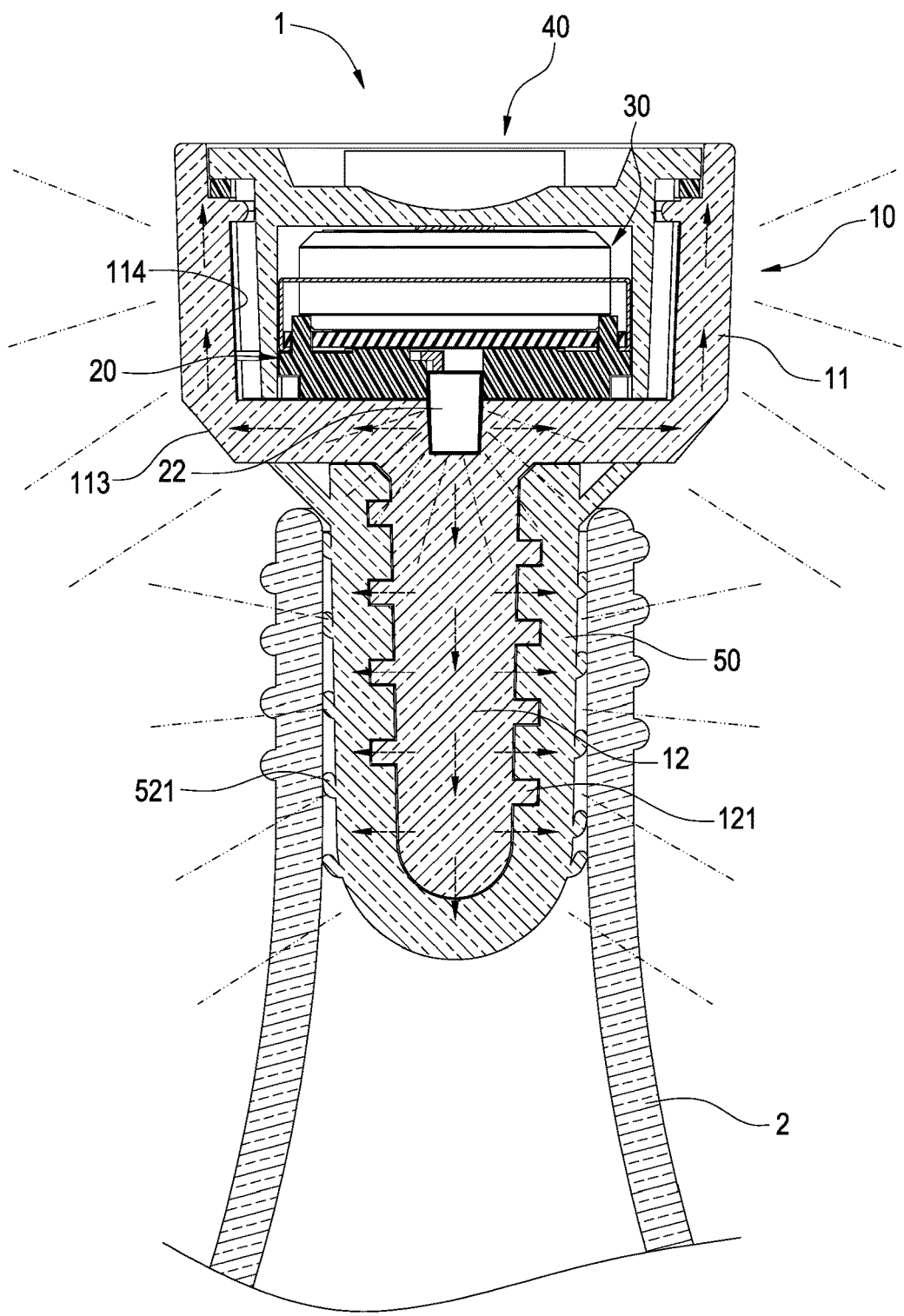
FIG. 6 is a lighting schematic view of the luminous bottle stopper of the present invention.

Please refer to FIG. 5 and FIG. 6, they depict a cross sectional view of the assembly of the luminous bottle stopper of the present invention and a lighting schematic view of the luminous bottle stopper of the present invention. As shown in FIG. 5, after assembling of the luminous bottle stopper 1 of the present invention, the air tightness between the stopper cover 40 and the light guide body 10 can be achieved through the seal ring 60 so that the light emitting module 20 and the power module 30 inside the light guide seat 11 will have good electricity characteristics. Furthermore, one part of the light emitting element 22 is located in the light guide seat 11, hence the light emitted from the light emitting element 22 will be transmitted to the light guide seat 11 and the light guide column 12, and then the light will be transmitted to outside through the light guide seat 11 and the light guide column 12.

Please refer to FIG. 6, the luminous bottle stopper 1 is used to be plugged in a mouth 2 of a bottle. As shown in the figure, the flexible sleeve 50 of the luminous bottle stopper 1 is sleeved on the light guide column 12 and can be plugged in the mouth 2 of the bottle. Furthermore, the light guide body 10 and the flexible sleeve 50 are made of light transmitting material. Thus the light emitted from the light emitting element 22 will be transmitted to the light guide seat 11 and the light guide column 12, and then the light will be transmitted to the outside through the light guide seat 11 and the light guide column 12. On the other side, the light emitted to the light guide column 12 will pass through the flexible sleeve 50 and the mouth 2 of the bottle so that the luminous bottle stopper 1 and areas surrounding the mouth 2 of the bottle both have lighting effects. Besides, the light guide ribs 121 of the light guide column 12 can facilitate a uniform and soft light conducting for a better luminous efficiency and enhance the overall appearance, creativity and uniqueness of the present invention.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A luminous bottle stopper to be plugged in a mouth (2) of a bottle, comprising:

a light guide body (10) made of light transmitting material, the light guide body (10) including a light guide seat (11) and a light guide column (12) connecting with the light guide seat (11), and the light guide seat (11) having an accommodating space (110);

a light emitting module (20) installed in the accommodating space (110), the light emitting module (20) including a circuit board (21) and a light emitting element (22) electrically connected with the printed circuit board (21) for providing incident light at an end of the light guide column;

a power module (30) installed in the accommodating space (110), the power module (30) including at least one battery (31) and a conduct element (32) electrically connected with the at least one battery (31);

a stopper cover (40) combined with the light guide seat (11) and sealing the accommodating space (110); and a flexible sleeve (50) made of light transmitting material, the flexible sleeve (50) being sleeved on the light guide column (12) and able to be plugged in the mouth (2) of the bottle.

2. The luminous bottle stopper according to claim 1, wherein an outer peripheral surface of the light guide column (12) is formed a light guide rib (121) shaped in helical.

3. The luminous bottle stopper according to claim 1, wherein an outer peripheral surface of the light guide column (12) has textures, printed veins or carved light guide lines (120).

4. The luminous bottle stopper according to claim 1, further including a seal ring (60), in which the seal ring (60) is disposed between the light guide seat (11) and the stopper cover (40); the light guide seat (11) is formed an annular groove (111) in the accommodating space (110), and the stopper cover (40) has a pressing plate (401) disposed correspondingly above the annular groove (111); the seal ring (60) is disposed in the annular groove (111) and pressed by the pressing plate (401).

5. The luminous bottle stopper according to claim 1, wherein the light guide seat (11) has a light guide angle (113) neighboring a side of the light guide column (12); an inner wall of the light guide seat (11) is further provided with a reflecting layer (114).

6. The luminous bottle stopper according to claim 4, wherein an inner wall of the light guide seat (11) is formed a plurality of resist ribs (112) at a bottom of the annular groove (111), and the resist ribs (112) are tightly attached to the stopper cover (40); the stopper cover (40) includes a cover plate (41) and a plurality of support plate (42) connected with the cover plate (41), and the resist ribs (112) abut against an outer side of the support plate (42).

7. The luminous bottle stopper according to claim 6, wherein the cover plate (41) has a notch (410), and the cover plate (41) is formed a positioning portion (411) in the notch (410); the luminous bottle stopper (1) is movably relative to the mouth (2) of the bottle by exerting on the positioning portion (411).

8. The luminous bottle stopper according to claim 1, wherein the light emitting module (20) further includes a bearing seat (23), and the bearing seat (23) carries the circuit board (21) and has a through hole (230) corresponding to the light emitting element (22); one part of the light emitting element (22) is located in the through hole (230) and another part thereof is located in the light guide seat (11).

9. The luminous bottle stopper according to claim 1, wherein the flexible sleeve (50) includes a holding portion (51) and a revolving fasten portion (52); the holding portion (51) is abutted upon a bottom of the light guide seat (11), and an outer peripheral surface of the revolving fasten portion (52) is formed a seal rib (521) shaped in helical.

10. The luminous bottle stopper according to claim 1, wherein an outer peripheral surface of the light guide column (12) is formed a light guide rib (121) shaped in helical; the flexible sleeve (50) is formed a light guide slot (501) shaped in helical and corresponded to the light guide rib (121), and the light guide rib (121) is located in the light guide slot (501).

\* \* \* \* \*